Feb. 5, 1963  R. W. DOWLING ET AL  3,076,382
LENS ARRANGEMENT FOR A BINOCULAR TELESCOPE
Filed Feb. 19, 1960  3 Sheets-Sheet 1

INVENTORS
ROBERT WHITTLE DOWLING
LORENZO del RICCIO
BY
ATTORNEYS

Feb. 5, 1963   R. W. DOWLING ET AL   3,076,382
LENS ARRANGEMENT FOR A BINOCULAR TELESCOPE
Filed Feb. 19, 1960   3 Sheets-Sheet 2
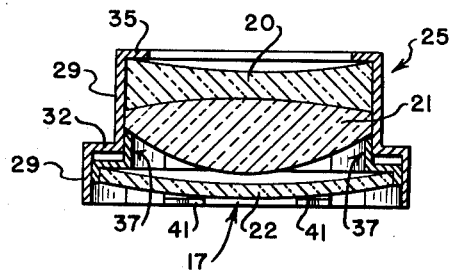
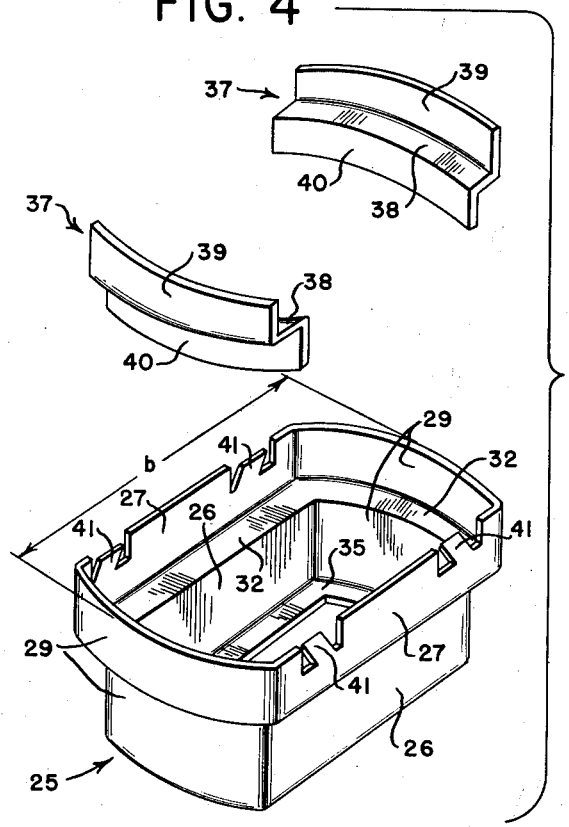
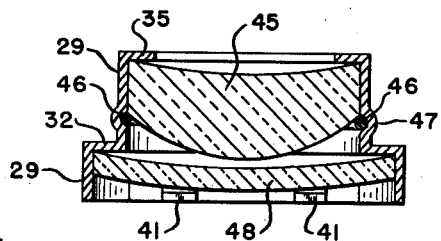
INVENTORS
ROBERT WHITTLE DOWLING
LORENZO del RICCIO
BY
ATTORNEYS Feb. 5, 1963 R. W. DOWLING ET AL 3,076,382
LENS ARRANGEMENT FOR A BINOCULAR TELESCOPE
Filed Feb. 19, 1960 3 Sheets-Sheet 3
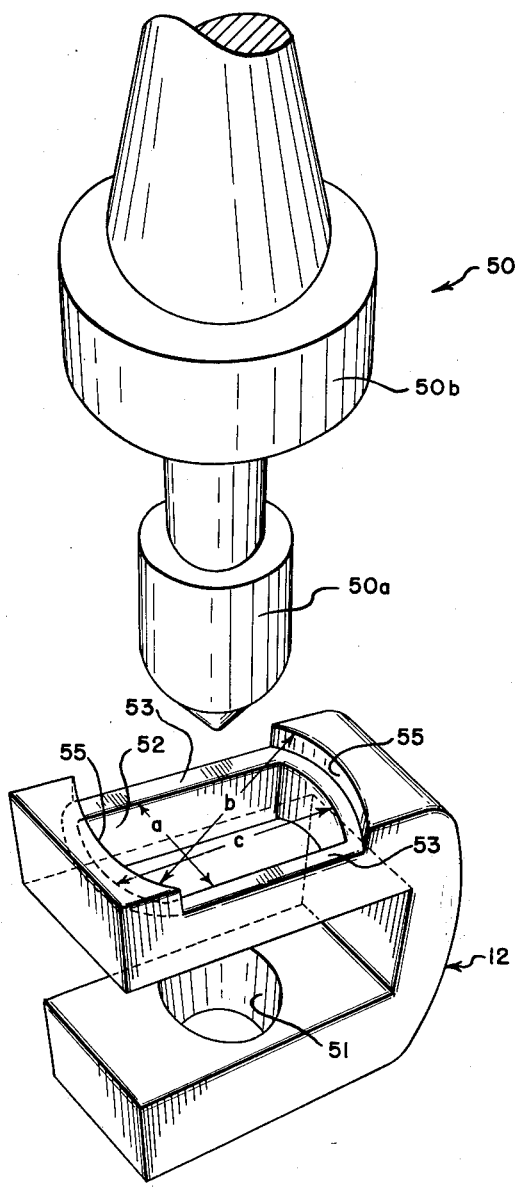
INVENTORS
ROBERT WHITTLE DOWLING
LORENZO del RICCIO
BY
ATTORNEYS United States Patent Office 3,076,382
Patented Feb. 5, 1963

3,076,382
LENS ARRANGEMENT FOR A BINOCULAR TELESCOPE
Robert W. Dowling, New York, N.Y., and Lorenzo del Riccio, Los Angeles, Calif., assignors to D & D Company, Inc., New York, N.Y., a corporation of Delaware
Filed Feb. 19, 1960, Ser. No. 9,765
Claims priority, application Germany Feb. 25, 1959
5 Claims. (Cl. 88—34)

This invention relates to a lens arrangement for a binocular telescope and specifically to a lens arrangement for a theater and sporting event binocular telescope.

Binocular telescopes commonly known have interconnected tubular lens barrels. Such instruments have irregular outer contours and are inconvenient for theater or sporting use. They are particularly inconvenient for carrying and intermittent viewing because the viewer either must have a special carrying case or must often disentangle the same from other objects in the pocket or purse before use.

These disadvantages can be overcome with laterally flattened lenses in a rectangular, generally smooth, compact binocular telescope such as described in our copending application "Binocular Telescope," Serial No. 783,977, filed December 30, 1958. Such a binocular comprises two compact, generally rectangular box-like lens casings arranged on a connecting bridge unitary support member.

In this type of binocular, the ocular-objective lens systems are contained in the lens casings. The casings provide a very compact, smooth rectangular arrangement for ease of carrying.

In the tubular lens barrel type mentioned the lenses can be readily, coaxially mounted in circular barrels or sleeves and held in place by rings screwed into the sleeves. But precise alignment of laterally flattened objective lenses on an optical axis common to both objectives and oculars has been a matter requiring adjustment by highly skilled technicians. Moreover, unlike the rigidly aligned lenses of the tubular barrel type binoculars, such adjustments have been easily disarranged during carrying.

The present invention provides for rigid and accurate lens mounting and supporting in a compact binocular telescope which utilizes laterally flattened objectives. Furthermore, this invention provides for simplified fabrication and assembly of such telescopes.

According to this invention lens units are provided which can be readily inserted into lens casing brackets. The brackets, which are U-shaped, are provided with lens unit support passages. The brackets and passages provided are adapted to support the lens units of each lens system in spaced relation and on a common axis.

The U-shaped brackets are disposed in the outer edges of the lens casings. The upper and lower bracket arms project inwardly of the binoculars parallel to and above and below the central bridge unitary support member. If desired, the brackets can be proportioned so that the ends of the central support are slidably embraced by the inner surfaces of the arms. The brackets can then be adapted to slide on the central support so that the casings may be extended to provide interpupillary distance accommodation during use.

The lens units provided including mounting sleeves and optical elements. Individual lens have a plurality of optical elements of different sizes. These elements can be coaxially disposed in each lens unit with the mounting sleeves of this invention.

For the objectives, the optical elements are laterally flattened and have circular-arc end edges. The objective mounting sleeve has flat walls to correspond to the laterally flattened edges and curved end walls to correspond to the circular-arc end edges. For the situation where the objective optical elements are not of the same length and width, the mounting sleeve is provided with stepped or offset walls. In this case each section of the sleeve is adapted to support certain optical elements only.

The stepped or offset walls of such sleeves are connected by shoulders which can be utilized for positioning certain of the optical elements. With these sleeves objective optical elements of several sizes are supported in optical axis alignment.

To hold the optical elements in spaced relation in the lens units, several holders such as, for example, grommets or snap rings may be used. According to this invention arcuate spacer strips are provided in the curved ends of the mounting sleeves. These strips are curved to conform to the end walls of the sleeves and offset to conform to the shoulders aforesaid.

The spacers are fitted into the curved sleeve ends outside the field of view to hold smaller inner optical elements in place. The offset portions of these spacers thus provide bearing surfaces against which an outer, larger optical element can be seated in assembly.

Alternatively, the curved ends of the sleeves can be provided with outwardly protruding ridges. These ridges are integral of the sleeve walls and therefore comprise grooves at their inner sides. After the optical elements are positioned, a bead of cement is placed in these grooves, slightly overlapping of the elements but outside the field of view, and allowed to harden in place.

Grommets, snap rings or the like may also be used to hold the elements in the sleeves. According to this invention, the upper and lower edges of the sleeves present flanges and restraining lugs. The flanges and lugs are turned inward against outer, optical surfaces to hold the elements in the sleeves.

The U-shaped brackets above mentioned are provided with guide faces which support the lens units. The guide faces suitably comprise support surfaces in each passage which conform to the outer walls of the lens unit mounting sleeves.

The upper arms of the brackets have cylindrical passages to accommodate cylindrical eyepieces. Circular ocular lens elements, mounted in cylindrical sleeves, are supported in the upper arm passages.

The guide faces in the lower arms, however, comprise "rectangular" passages, that is, passages which have flat walls to accommodate the laterally flattened objective lenses. The ends of these so-called "rectangular" passages comprise cylindrical-section circular-arc guide faces for accommodating the ends of the objectives mounting sleeves.

The difficulty heretofore extant with this type of arrangement has related to obtaining precise coaxial alignment of both objective and ocular lenses in the lens systems.

According to this invention, the principal curved, cylindrical guide faces of each passage are provided by one rotating cutting tool. This tool is adapted with cutting surfaces of different diameters spaced apart on a common shaft. Cylindrical guide faces, with a diameter corresponding to that for the ocular lens unit support passage, are first provided about the optical axis in both arms.

The two cutting surfaces which rotate about the optical axis are then allowed to move further in the ocular direction and the second cutting edge machines the principal circular-arc guide faces for the objective lens units. The remainder of the objective guide faces are then machined by standard milling techniques.

With the sleeves of this invention, laterally flattened objective optical elements of several sizes can be readily aligned. The sleeves and spacers provided support the optical elements of each lens unit in rigid spaced relation precisely on a common optical axis.

Moreover, the lens systems are accurately and rigidly supported in the brackets of this invention. The objective and ocular lens units can be permanently assembled in coaxial alignment. The brackets are strong, and the alignment will not be disturbed by ordinary jostling and bumping which can be expected during use.

Fabrication and production costs for the binoculars are reduced by this invention. At the same time, a compact binocular is provided which has quality optical systems.

In the portion of the specifications which follows the invention is described in detail. Reference will be made to the accompanying drawings in which:

FIG. 3 is a detail section of the objective lens unit taken along line 2—2 of FIG. 1.

FIG. 4 is an inverted pictorial representation of the objective sleeve and spacing members.

FIG. 5 is a section similar to that of FIG. 3 showing details of a second embodiment of the objective lens unit.

FIG. 6 is a pictorial representation of a U-shaped lens bracket (inverted) and of the cutting tool employed to make the lens support openings.

Figures 1, 2:
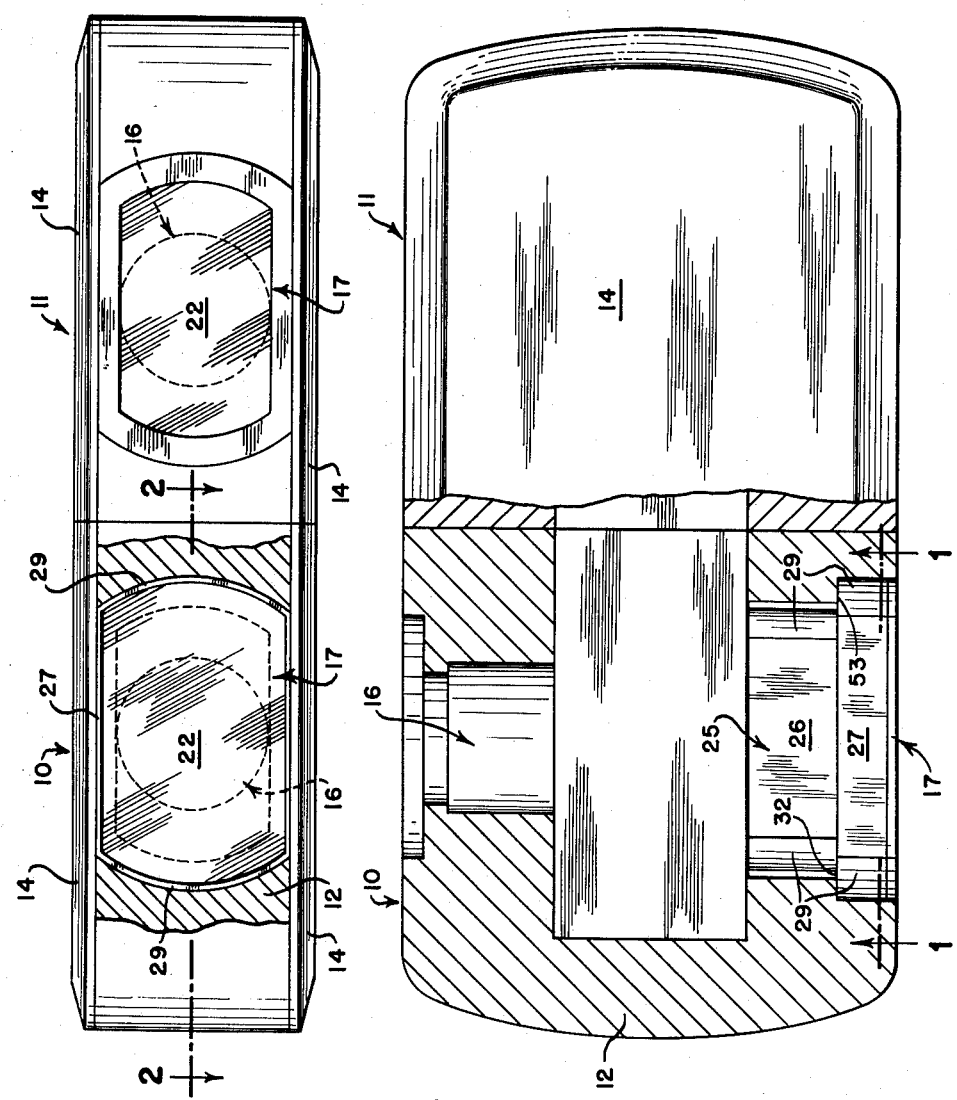
FIG. 1 is an elevation view of the objective side of a binocular telescope comprising the lens arrangement of the invention, showing a partial objective section taken along line 1—1 of FIG. 2.
FIG. 2 is a plan view of the binocular showing a partial mid-plane section taken along line 2—2 of FIG. 1.

In FIGS. 1 and 2, the two lens casings of the binocular are designated 10 and 11. Each comprises a U-shaped lens bracket 12 and covers 14. Ocular lens unit 16 and objective lens units 17 are arranged in the arms of the brackets. The eyepieces or ocular lens units comprise circular ocular lenses which are mounted in cylindrical sleeves.

As is evident in FIG. 3, the objective lens unit 17 comprises two adjacent, smaller, inner optical elements 20 and 21 as well as a larger, outer optical element 22. These elements or lenses are housed in a lens mounting sleeve 25 shown in inverted detail in FIG. 4. Sleeve 25 has upper parallel flat side wall sections 26 of smaller separation and lower parallel flat side wall sections 27 of larger separation. The flat side wall sections are connected by curved end walls 29. The curved end wall surfaces comprise several circular cylindrical surface sections continuous at their sides with the ends of the flat side wall sections. Said cylindrical sections are therefore of smaller transverse separation in the upper portions of the sleeve 25 (note FIG. 3), and larger transverse separation in the lower portions. The upper and lower sleeve sections as described are connected over an intermediate periphery of sleeves 25 through a flat horizontal shoulder 32.

At its upper edge, the smaller sleeve section 26 has an inturned flange 35 against which optical element 20 is positioned. Optical element 21 being positioned against element 20 is held in place by thin arcuate spacers 37. The spacers 37, as may be seen particularly from FIG. 4, are formed of upper and lower curved surfaces 40 and 39 that are laterally offset from each other. These curved surfaces are joined by a horizontal shoulder 38 corresponding in width to that of the ends of the described horizontal shoulder 32 of the mounting sleeve 25. The curved spacing members 37 fit into the curved end portions of sleeves 25 (as seen in FIG. 3) outside the field of view, with the upper edges of surface 40 bearing against the inner optical element 21.

The objective lens element 22 is positioned on shoulder 38 and thus is spaced at its ends from the ends of element 21 by a distance corresponding to the height of the upper surface 40 and the thickness of shoulder 38.

Restraining lugs 41 arranged in the lower edges of the side walls 27 are turned or bent inward against optical element 22 and secure the objective lens elements in the mounting sleeve 25.

The optical elements are thus supported in spaced relation on a common axis internal of the mounting sleeves 25 by the sleeves and spacers as described.

In the embodiment of FIG. 5, the inner optical element 45 is arranged in a similar upper sleeve section. Element 45 is held in place by spacer means comprising overlapping beads of cement 46. Said cement is placed in grooves of radially outwardly protruding ridges 47 of the mounting sleeve outside the field of view and allowed to harden in place. The cement 46 and ridges 47 are spaced from flanges 35 by a distance approximately equivalent to the total thickness of the surved ends of the inner optical elements.

The optical element 48 is held in the lower sleeve sections 29 and 27 seated on the shoulder 32 by lugs 41, as in the embodiment of FIGS. 3 and 4. The separation of the ends of the two lenses 45 and 48 is established by the distance from the grooves of ridges 47 to the lower surfaces of shoulder 32.

As seen, the laterally flattened objective optical elements are not all of the same outer dimensions. The stepped interior surface of the mounting sleeve 25 as described, is adapted to accommodate these optical elements. The lens brackets 12 are similarly adapted to accommodate the corresponding exterior stepped surfaces of the mounting sleeves.

In these objective lens units, the horizontal separations of the flat, parallel upper and lower sleeve walls are therefore, approximately equivalent to the width across flats of the inner and outer laterally flattened optical elements, respectively. Similarly, the lateral separations of the upper and lower curved ends of the sleeves correspond to the lateral dimensions of the said inner and outer elements, with provision of course for the amount of thickness interposed in the case of lower spacer curved surfaces 39.

The radii of curvature of the upper cylindrical wall sections of the sleeves and arcuate spacers 37 are approximately equivalent and correspond approximately to the radii of the curved ends of the inner optical elements. Similarly, the radii of curvature of the lower cylindrical wall sections of the sleeves and arcuate spacers are approximately equivalent, corresponding approximately to the radii of the curved ends of the respective outer optical elements.

The several components of each lens uint are all disposed symmetrically with respect to one common optical axis. The said lower cylindrical wall sections are spaced from that axis by distances which are approximately equivalent to the radii of said lower sections.

With reference particularly to FIGS. 1, 2 and 6, it will be seen how the ocular and obective optical elements, positioned in their mounting sleeves, are axially aligned and supported in the U-shaped lens brackets 12.

A passage is drilled through both arms of bracket 12 by means of a tool 50 (see FIG. 6). The section of tool 50 which cuts this passage is designated as 50a. The width a of objective lens unit support passage 52 corresponds to the diameter of the ocular passage 51 and of tool section 50a. Cutting tool 50 further comprises a circular section 50b whose diameter accurately corresponds to the separation of the lower curved end surfaces 29 of the mounting sleeves 25, i.e., corresponds to the diametric distance separating exterior faces of the lower sleeve end surfaces 29 shown as b in FIG. 4.

Tool section 50b cuts into supporting bracket 12 to a depth equivalent to the total height of lower sleeve section 27 leaving cylindrical section circular arc guide faces 55 separated from each other by the distance described and also designated in FIG. 6 as b. Guide faces 55 accurately position the objective mounting sleeve 25 with respect to the optical axis.

The remainder of passage 52 is then milled to the dimensions of a and c, corresponding approximately to outer dimensions of the upper mounting sleeve portions, as shown in FIG. 6, to permit assembly.

Since the principal objective guide faces 55 machined with the same rotary cutting tool as passage 51 are exactly coaxial with the cylindrical lens unit support surfaces in ocular passage 51, the objective and ocular lens units can be supported in the bracket arms in precise axial alignment. With the critical dimensions *b* being provided in the fashion described, dimensions *a* and *c* need not be exactly equivalent to the corresponding lesser exterior sleeve dimensions of sleeve sections 26 and 29. Therefore dimensions *a* and *c* of passage 52 can be milled to ordinary tolerances and may be slightly larger than the corresponding sleeve dimensions to provide production simplicity and reduced cost.

Horizontal flat shoulder surface 53 remains, of course, after machining, at the lower edges of the inner flat walls, continuous around an intermediate periphery of the objective passage. Shoulders 53 connect the upper and lower cylindrical section guide faces in each objective passage and also connect the lower edges of the upper flat wall guide faces with the front and rear surfaces of the lower bracket arms. The exterior surface of shoulder 32 of the sleeves 25 is seated against shoulder 53 in assembly.

It should be understood that the descriptions of specific details above are illustrative. Accordingly, reference should be made to the claims to determine the scope of this invention.

We claim:

1. In a binocular telescope having a pair of ocular-objective lens systems, the objective lenses of said systems being laterally flattened, and two compact, generally rectangular box-like lens casings slidably supported on a central bridge support member to provide interpupillary accommodation during use, objective lens units comprising optical elements of different maximum dimension and mounting sleeves having offset side walls therefor, said elements being disposed internally of said sleeves, said elements being supported in each of said units in spaced relation of a common optical axis by said sleeves and by arcuate, offset spacers disposed internally of said sleeves outside the field of view, and U-shaped lens brackets disposed internally of said lens casings at the outer edge portions thereof, said brackets having upper and lower arms oriented projecting inwardly of said binoculars parallel to said central support, the said brackets having lens unit support passages disposed symmetrically about the optical axis internally of said arms, said passages comprising guide faces for supporting said lens systems including flat and cylindrical surfaces disposed in said lower arms adaped for supporting said objective lens units in said lens systems in optical axis alignment, each of said cylindrical guide faces having an axis coincident with said optical axis and each of said mounting sleeves having cylindrical end walls conforming closely to said guide faces, said guide faces also being offset in said lower arms to conform to said sleeves and including a horizontal shoulder connecting said offset faces for maintaining said objective lens units in spaced relation in said lens systems.

2. A lens bracket including spaced arms for mounting ocular and objective lens combinations along an optical axis, one of said arms defining a cylindrical passage having an axis coincident with said optical axis, a cylindrical sleeve conforming to said cylindrical passage and mounted therein, a circular ocular lens unit mounted in said sleeve with the axis thereof coincident with said optical axis, the other of said arms defining a second passage having opposed flattened walls and opposed cylindrical walls, said cylindrical walls comprising guide faces having an axis coincident with said optical axis, an objective lens arrangement including a plurality of laterally flattened optical elements, a supporting sleeve therefor and means mounting said elements in said sleeve with their optical axes coincident, said sleeve having at least two sets of offset laterally flattened walls and opposed cylindrical walls of different height and width dimensions between the respective sets of flattened and cylindrical edges thereof, said optical elements conforming closely to the internal dimensions of said sleeve for reception therein along a common optical axis, at least one set of said cylindrical end walls being of a curvature conforming to said guide faces, said second passage being adapted to receive said objective lens mounting sleeve with the cylindrical end walls thereof in contact with said guide faces to orient the optical axes of said objective lens elements and said ocular lens unit in coincidence with said optical axis.

3. A lens bracket including spaced arms for mounting ocular and objective lens combinations along an optical axis, one of said arms defining a cylindrical passage having an axis coincident with said optical axis, a cylindrical sleeve conforming in curvature to said cylindrical passage and mounted therein, a circular ocular lens unit mounted in said sleeve with the axis thereof coincident with said optical axis, the other of said arms defining a second passage having opposed flattened walls and sets of opposed cylindrical walls, one of said sets joining said flattened walls and another of said sets comprising guide faces having an axis coincident with said optical axis, each of said sets being separated by different lateral dimensions, an obective lens unit including a plurality of optical elements having laterally flattened front and rear edges and circular-arc end edges, said unit including smaller optical elements having lesser separation between said laterally flattened edges than said larger optical element and having lesser lateral separation between said end edges than said larger element, a mounting sleeve having offset side walls for mounting said elements, said sleeve having two sets of flat walls and cylindrical joining end walls in stepped relation conforming to said edges of said optical elements, at least one of said sets of end walls conforming in curvature to said guide faces, a horizontal shoulder connecting said offset side walls, an inturned flange at the upper edge and inturned lugs at the lower edge of said sleeve to hold said elements therein, said elements being disposed in said sleeve, with their optical axes coincident, and arcuate offset spacers conforming to said arcuate sleeve walls and said shoulder, said spacers being disposed internally of said arcuate sleeve walls outside the field of view to hold said optical elements in spaced relation, and means for mounting said sleeve in said second passage with the conforming set of cylindrical end walls thereof in contact with said guide faces.

4. A lens bracket including spaced arms for mounting ocular and objective lens combinations along an optical axis, one of said arms defining a cylindrical passage having an axis coincident with said optical axis, a cylindrical sleeve conforming in curvature to said cylindrical passage and mounted therein, a circular ocular lens unit mounted in said sleeve with the axis thereof coincident with said optical axis, the other of said arms defining a second passage having opposed flattened walls and sets of opposed cylindrical walls, one of said sets joining said flattened walls and another of said sets comprising guide faces having an axis coincident with said optical axis, each of said sets being separated by different lateral dimensions, an objective lens unit including a plurality of optical elements having laterally flattened front and rear edges and circular-arc end edges, said unit including smaller optical elements having lesser separation between said laterally flattened edges than said larger optical element and having lesser lateral separation between said end edges than said larger element, a mounting sleeve having offset side walls for mounting said elements, said sleeve having two sets of flat walls and cylindrical joining end walls in stepped relation conforming to said edges of said optical elements, at least one of said sets of end walls conforming in curvature to said guide faces, a horizontal shoulder connecting said offset side walls, an inturned flange at the upper edge and inturned lugs at the lower edge of said sleeve to hold said elements therein, said elements being disposed in said sleeve with their optical axes coincident, spacer means internally of said sleeve walls outside the field of view to hold said optical elements in spaced relation, and means for mounting said sleeve in said second passage with the conforming set of cylindrical end walls thereof in contact with said guide faces.

5. The lens mounting arrangement of claim 4 in which said spacer means comprises a groove formed internally of said sleeve walls and a bead of cement retained in said groove, said bead bearing against peripheral edge portions of one of said optical elements for retaining said element against the inturned flange at the upper edge of said mounting sleeve, the other of said optical elements having peripheral edge portions thereof held between said horizontal shoulder and the inturned lugs at the lower edge of said sleeve.

References Cited in the file of this patent

UNITED STATES PATENTS

| | | |
|---|---|---|
| 535,862 | Sawyer | Mar. 19, 1895 |
| 959,169 | Richmond | May 24, 1910 |
| 959,387 | Richmond | May 24, 1910 |
| 1,482,881 | Berggren | Feb. 5, 1924 |
| 1,722,520 | Glancy | July 30, 1929 |
| 2,124,157 | Trautmann | July 19, 1938 |
| 2,534,776 | Kershaw et al. | Dec. 19, 1950 |